(12) United States Patent
Pulijala et al.

(10) Patent No.: US 8,879,389 B2
(45) Date of Patent: Nov. 4, 2014

(54) TRAFFIC HANDLING FOR MOBILE COMMUNICATION-BASED ADVERTISEMENTS

(75) Inventors: Amitha Pulijala, Milpitas, CA (US); Terje Strand, San Francisco, CA (US); Sharath Rajasekar, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 314 days.

(21) Appl. No.: 12/945,745

(22) Filed: Nov. 12, 2010

(65) Prior Publication Data

US 2011/0110234 A1    May 12, 2011

Related U.S. Application Data

(60) Provisional application No. 61/260,798, filed on Nov. 12, 2009.

(51) Int. Cl.
| | |
|---|---|
| *H04L 12/26* | (2006.01) |
| *H04W 28/10* | (2009.01) |
| *G06Q 30/02* | (2012.01) |
| *H04W 24/00* | (2009.01) |
| *H04W 4/12* | (2009.01) |
| *H04L 12/801* | (2013.01) |

(52) U.S. Cl.
CPC ........... *H04W 28/10* (2013.01); *G06Q 30/0275* (2013.01); *H04W 24/00* (2013.01); *G06Q 30/0267* (2013.01); *H04W 4/12* (2013.01); *G06Q 30/0273* (2013.01); *G06Q 30/0269* (2013.01); *H04L 47/14* (2013.01); *G06Q 30/0276* (2013.01); *H04L 47/29* (2013.01)
USPC ......................................... 370/235; 370/252

(58) Field of Classification Search
USPC .......... 370/229, 235, 236, 241, 252, 389, 390
See application file for complete search history.

(56) References Cited

U.S. PATENT DOCUMENTS 7,301,905 B1 * 11/2007 Tontiruttananon et al. ... 370/232
7,865,394 B1    1/2011 Calloway et al.
(Continued)

FOREIGN PATENT DOCUMENTS

| CN | 101366237 | 2/2009 |
| CN | 101330665 | 11/2009 |
| WO | 2008095340 | 8/2008 |

OTHER PUBLICATIONS

International Preliminary Examination Report dated May 24, 2012 for Application No. PCT/US2010/056593, 6 pages.

(Continued)

*Primary Examiner* — Michael Thier
*Assistant Examiner* — Feben M Haile
(74) *Attorney, Agent, or Firm* — Meyer IP Law Group

(57) ABSTRACT

A communications advertising system is described for delivering ad content to subscribers of a telecommunications network. The system performs traffic handling by using at least two limits for regulating message transmission. During processing, a network node of the system can continuously monitor the quantity of message traffic being processed. If the node detects that the quantity of traffic has decreased below a first limit, it can initiate the processing of reserved bulk messages. The node then continues to transmit the bulk traffic while still measuring the quantity of message traffic being processed. If, thereafter, the node detects that the quantity of overall message traffic being processed has exceeded a second limit, the processing of bulk messages is halted until the quantity of regular traffic decreases below the first limit once again, at which point the node can resume processing the bulk message traffic.

20 Claims, 5 Drawing Sheets

(56) References Cited

U.S. PATENT DOCUMENTS

| | | |
|---|---|---|
| 7,886,347 B2 | 2/2011 | Gill et al. |
| 8,099,316 B2 | 1/2012 | Moukas et al. |
| 8,165,916 B2 | 4/2012 | Hoffberg et al. |
| 2003/0070167 A1 | 4/2003 | Holtz et al. |
| 2004/0205135 A1 | 10/2004 | Hallam-Baker |
| 2006/0206355 A1 | 9/2006 | Cheung et al. |
| 2006/0288100 A1 | 12/2006 | Carson et al. |
| 2007/0027850 A1 | 2/2007 | Chan et al. |
| 2007/0066353 A1 | 3/2007 | Silverbrook et al. |
| 2007/0088605 A1 | 4/2007 | Ghate et al. |
| 2007/0088801 A1 | 4/2007 | Levkovitz |
| 2007/0088851 A1 | 4/2007 | Levkovitz |
| 2007/0088852 A1 | 4/2007 | Levkovitz |
| 2007/0142052 A1 | 6/2007 | Kalavade |
| 2007/0161409 A1 | 7/2007 | Ohtsuki et al. |
| 2007/0191040 A1 | 8/2007 | Kadar et al. |
| 2007/0242700 A1 | 10/2007 | Moote et al. |
| 2007/0244760 A1 | 10/2007 | Bodnar et al. |
| 2008/0021778 A1 | 1/2008 | Perkowski et al. |
| 2008/0070558 A1 | 3/2008 | Lovell |
| 2008/0120129 A1 | 5/2008 | Seubert et al. |
| 2008/0167957 A1 | 7/2008 | Steelberg et al. |
| 2008/0195462 A1 | 8/2008 | Magdon-Ismail |
| 2008/0235327 A1 | 9/2008 | Maes et al. |
| 2008/0255936 A1 | 10/2008 | Ghate |
| 2008/0255944 A1 | 10/2008 | Shah et al. |
| 2008/0275753 A1 | 11/2008 | Protheroe et al. |
| 2008/0275777 A1 | 11/2008 | Protheroe et al. |
| 2008/0307108 A1 | 12/2008 | Yan et al. |
| 2008/0318559 A1 | 12/2008 | Porco |
| 2009/0012807 A1 | 1/2009 | Atherton et al. |
| 2009/0089131 A1 | 4/2009 | Moukas et al. |
| 2009/0094114 A1 | 4/2009 | Rice et al. |
| 2009/0171948 A1* | 7/2009 | Solomon et al. .................. 707/5 |
| 2009/0186635 A1* | 7/2009 | Vieri ............................ 455/466 |
| 2009/0198579 A1 | 8/2009 | Lewis et al. |
| 2009/0199114 A1 | 8/2009 | Lewis et al. |
| 2009/0216682 A1 | 8/2009 | Foladare et al. |
| 2009/0217316 A1 | 8/2009 | Gupta |
| 2009/0240586 A1 | 9/2009 | Ramer et al. |
| 2009/0271267 A1 | 10/2009 | Moukas et al. |
| 2009/0298480 A1 | 12/2009 | Khambete et al. |
| 2009/0306834 A1 | 12/2009 | Hjelm et al. |
| 2009/0307091 A1 | 12/2009 | Lilley |
| 2010/0058383 A1 | 3/2010 | Chang et al. |
| 2010/0063877 A1 | 3/2010 | Soroca et al. |
| 2010/0107191 A1* | 4/2010 | Feng et al. ..................... 725/32 |
| 2010/0142421 A1 | 6/2010 | Schlicht et al. |
| 2010/0161638 A1 | 6/2010 | Macrae |
| 2010/0291924 A1 | 11/2010 | Antrim et al. |
| 2010/0312643 A1 | 12/2010 | Gil |
| 2011/0065421 A1 | 3/2011 | Gluck et al. |
| 2011/0112905 A1 | 5/2011 | Pulijala et al. |
| 2011/0112906 A1 | 5/2011 | Pulijala et al. |
| 2011/0191163 A1 | 8/2011 | Allaire et al. |
| 2012/0179534 A1 | 7/2012 | Moukas et al. |
| 2012/0208512 A1 | 8/2012 | Maharajh et al. |

OTHER PUBLICATIONS

Business_process_Execution_Languag02nov2012; Wikipedia Nov. 2, 2012.

rfc3588_DiameterProtocolAAA—providing Authentication, Authorization and Accounting; Sun Microsystems, Cisco Systems; Sep. 2003.

Diameter_(protocol); http://en.wikipedia.orglwikilDiameter_(protocol); accessed by Examiner Nov. 6, 2012.

Oracle; Oracle Communications Marketing and Advertising; System Owner User's Guide Release 5.0.0.0 E15497-01; Nov. 2009; 260798, Appendix to the Specification, Whole Document.

Nternational Searching Authority of the United States Patent and Trademark Office, International Search Report and Written Opinion for PCT International Application No. PCT/US2010/056593, May 23, 2011, 8 pages.

State Intellectual Property Office of the People's Republic of China, Office Action for Chinese Patent Application No. 201080051017.X, Apr. 28, 2014, 9 pages.

* cited by examiner

TRAFFIC HANDLING FOR MOBILE COMMUNICATION-BASED ADVERTISEMENTS

CLAIM OF PRIORITY

The present application claims the benefit of U.S. Provisional Patent Application No. 61/260,798, entitled "COMMUNICATIONS MARKETING AND ADVERTISING SYSTEM AND METHOD", by Sharath Rajasekar et al., filed on Nov. 12, 2009, which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to systems for delivering marketing and advertisements over various forms of mobile communications, such as the short messaging service (SMS), and more particularly to managing message traffic containing such advertisements.

BACKGROUND

Online integration with various communication devices is creating new realms for advertisers and other content providers. Marketing campaigns in the past have been mostly focused on television, radio, paper media and internet. Today's advertisers are seeking a more tailored and personalized approach. Rather than bombarding the masses with general interest ads, the advertisers are slowly becoming more focused on selected groups of people that have a common interest in a particular subject, product or service. This is proving to enable both higher returns on investment (ROI) on the part of the advertiser, as well as less annoyance and frustration on the part of the consumer.

In this context, some industry rivalries are beginning to emerge between network operators (e.g. T-Mobile, Verizon Wireless, AT&T, etc.) on the one hand and internet service providers (ISPs), online ad vendors and various other content providers on the other. While ad server vendors, such as Google, have shown a very successful business model in online advertising, network operators have played a much less significant part in targeting ads. Yet network operators are uniquely and favorably positioned in the marketplace for obtaining various information and managing diverse relationships between a multitude of players. In addition to having access to the user's preferences and data, the operator also controls many aspects of the communication transmission in the network. For example, the network operator owns the mobile cellular network and its hardware elements (SMS-C, MMS-C, etc) as well as the information regarding its subscribers. As new services and products emerge, it is desirable for network operators to manage and monetize their position in order to continue to be able to compete in the future.

One area of potential improvement is in this environment arises from the need for the network operator to integrate the various targeted advertisements with the existing message traffic, such as SMS and MMS traffic that is already flowing throughout its network. For example, it is desirable that marketing and advertising does not interfere with existing traffic flow, does not overload the system, cause latency or create other potential problems.

DETAILED DESCRIPTION

Figure 1:
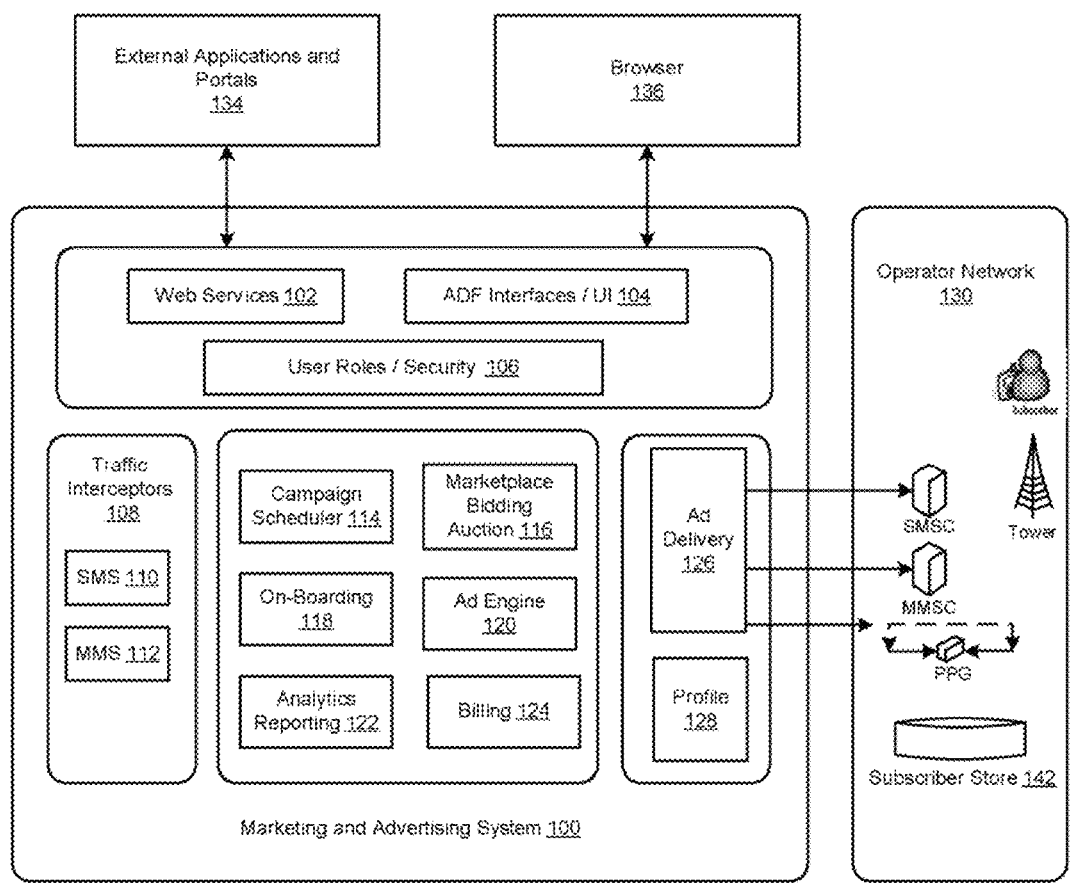
FIG. 1 is a high level architecture illustration of the mobile communications marketing system that can implement the traffic handling functionality described throughout this disclosure.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

In various embodiments, the traffic handling and scheduling described herein can be used in a communications marketing and advertising system that allows various advertisers to create promotional advertising campaigns for delivery to subscribers of a communications network. The system can also allow entities that would like to provide the space for those campaigns to interact in an environment that is tightly integrated with the telephony network over which those campaign messages flow. In one embodiment, the system can be accessed as a Web Application over the Internet.

The system can be deployed by a network operator that owns the telecommunications network (e.g. telephony network, cellular network, etc) and the information about its subscribers. Once deployed, the system can be utilized to create and deliver advertisement content by way of the message traffic flowing across the operator's network. The system can support a variety of use cases for delivering this ad content.

One such use case is bulk messaging marketing campaign with uploaded lists. This can be used when the advertiser has a list of subscribers that it wants to send the advertising content to. For example, a software company that wants to notify its registered users of a new version of its application can upload its list of user addresses to the marketing system. The software company would then select and customize an existing template and click create, whereupon the marketing system creates a bulk SMS campaign and sends it out to the supplied addresses.

Another use case is bulk messaging marketing campaign with subscriber categories. This can be used when the advertiser may not have an existing list of subscribers but may still want to tailor its advertisements to specific groups of persons according to various criteria. As an illustration, a new clothing chain may want to attract women between ages 18-25 for delivering its ad content to. The company can log into the marketing and advertising system and select a criteria set defined by the network operator based on its subscriber records and subscriber opt-in preferences. The system can then create a bulk MMS campaign using an address list it has created based on subscriber demographics. The ad in the campaign offers the subscribers who receive the personalized message a free scarf with their first purchase. In various alternative embodiments, other such use cases are possible and well within the scope of the present invention.

As these bulk marketing campaigns are created, it can be advantageous for the network operator to schedule the bulk messaging traffic to be transmitted gradually and in an optimized manner, so as not to overload the network nodes which are also processing regular SMS/MMS/WAP Push traffic. For example, a network operator typically sets limits on the amount of message traffic that can be processed by its nodes in order to guarantee service. If these limits are exceeded, a node may throw an exception or generate some other error indicating that the node is overloaded and that the message could not be sent and may need to be re-tried again later. Because of these limits and the processing load on the operator's network, it is important to ensure that a bulk messaging campaign does not overwhelm the network nodes and interfere with the processing of regular SMS, MMS and WAP Push traffic being transmitted by the subscribers. This can be achieved by implementing a traffic handling and scheduling policy described herein.

In one embodiment, the method for traffic handling uses at least two limits for regulating the transmission of bulk messaging traffic. During processing, a network node can periodically or continuously measure the quantity of regular message traffic being processed by the network node. If the node detects that the quantity of regular message traffic being processed has decreased below the first predefined limit, it can initiate the processing of the reserved bulk messages. The node then continues to process and transmit the reserved bulk messages while still measuring the quantity of message traffic being processed by the network node. If, thereafter, the node detects that the quantity of overall message traffic being processed has exceeded a second predefined limit, the processing of bulk messages is halted. This halting can be implemented by either abruptly dropping any bulk messages from the node or by precluding the node from retrieving anymore bulk messages from the queue, until the quantity of regular traffic decreases below the first limit once again, at which point the node can resume processing the bulk message traffic.

In effect, a buffer is created for using excess network capacity to process and transmit the bulk messages within a system where priority is given to the regular network traffic between subscribers. In various embodiments, this form of traffic handling can enable the network operator (or its customers) to create a bulk advertising campaign and to schedule the campaign to be carried out over a period of time so as not to overwhelm the network.

FIG. 1 is a high level architecture illustration of the mobile communications marketing system that can implement the traffic handling functionality described throughout this disclosure. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the communications marketing system 100 can be deployed by a network operator and can be exposed to external applications and portals 134 over Web Services 102. It can also be made accessible by way of browser 136 enabled devices over ADF interfaces, UIs and the like 104. Access to the marketing system can be controlled based on assigned user roles and other security measures 106. In one embodiment, the marketing system resides at the gateway to the operator's network.

The advertising system 100 includes a set of traffic interceptors 108 that can intercept message traffic between subscribers of the operator's network 130 and inject various advertisements therein, as well as perform a variety of other functions. For example, an SMS interceptor 110 may intercept an SMS message and transmit a response SMS with an advertisement embedded in the response. Similarly, an MMS interceptor 112 may intercept an MMS message and embed some content customized for the receiving subscriber according to their profile. The traffic interceptors can be applied as a chain in a particular sequence to the messages flowing through the network. Each interceptor may contain a set of filters to discern which messages it should be applied to, such that the interceptor is only executed for the messages containing a certain criteria.

The core of the marketing and advertising system 100 can comprise a campaign scheduler, 114, a marketing and bidding auction place module 116, an on-boarding component 118, an ad engine 120, analytics and reporting 122 and a billing component 124. All of these components can enable the operator to allow advertisers to create marketing campaigns which will be carried out using the marketing and advertising system. These campaigns can be bulks of messaging advertisements or alternatively be tailored for individual intercepted messages according to the subscriber profile information. In one embodiment, the advertiser creates a campaign based on available campaign spaces. It provides the ad content and, if desired, provides the subscriber lists for the marketing campaigns. The campaign is then carried out by transmitting the appropriate ads in accordance with the traffic handling techniques described throughout this disclosure. In addition, the advertiser can monitor its campaigns and obtain access to the statistics for them.

The campaign scheduler 114 is responsible for scheduling the advertising campaigns and managing their lifecycles. In one embodiment, once the campaign is created and approved by the ad space owner, it can be given an ACTIVE state. If it is not approved, it is placed in a REJECTED state. Once this is approved, the advertiser can search the list for available ad spaces in the marketplace and select the one appropriate for its needs. The advertiser can bid on the selected ad space by entering the number of ad messages for which it is willing to pay for. When the bid is approved, the winning campaign can be transferred to the SCHEDULED state by the campaign scheduler 114. Thereafter, once the start time is reached, the campaign changes to the RUNNING state and intercepted traffic has ad content placed into it. The campaign can also be STOPPED and DELETED.

The marketplace component 116 allows the operator to pair advertisers with various applications that may be sending or receiving SMS/MMS messages. Using the marketplace of the marketing and advertising system, applications can offer ad spaces and advertisers can search for openings and bid on them. As an illustration, if a text-to-vote television show were aired that was expected to receive a particular number of SMS votes, a corresponding ad campaign could be created. The various advertisers can then submit bids for an advertising spot in the exchange of SMS messages that would be transmitted over the network during this campaign. For example, an organization can submit an electronic bid offering a particular amount for each SMS message. The network operator can then award the campaign to the winning bid. In this manner, the electronic marketplace provides the network operator with means for creating and monetizing relationships between advertisers, service providers (e.g. text-to-vote application) and mobile subscribers. Based on network availability, operators can also offer customizable bulk messaging slots, purchased by advertisers on a fixed-price basis, with the entire transaction enabled through the browser-based interface 136.

The ad engine 120 can be responsible for the mechanics of matching ad content with the appropriate messaging context, whether it be ad spaces in intercepted messages from an application or bulk messages generated by the system itself. The ad engine functions once the campaign has been initiated through the graphical user interface (GUI). In criteria-based campaigns, the ad engine is also responsible for ensuring that the subscribers who are targeted fit the correct demographic profile as derived from the information obtained in the subscriber profile data store 142.

The analytics, reporting and statistics engine 122 can enable monitoring the progress of a campaign, such as the number of ads served, the ongoing cost/revenue and the like both as it happens in real time and collectively over longer periods of time. This monitoring can be used by the advertisers, applications and operators in various ways. The system can display data pertinent to each user type in both detailed tables and dashboard-like charts and graphs. Reports can also be exported.

The on-boarding component 118 can allow the operator to integrate various external partners, customers, advertisers and other entities with the communications marketing system 100. The on-boarding module can take care of registering the new entity so that appropriate access can be provided to the system from its perspective.

The billing integration module 124 can produce detailed charging data records (CDRs) for each ad served through the system. The CDRs can be converted into Diameter Rf offline charging within the system and then passed onto billing systems such as billing and revenue management (BRM) systems for rating and billing.

Ad delivery 126 can be performed by employing the short messaging service center (SMS-C), multimedia messaging service centers (MMS-C), Push Proxy Gateway (PPG), and other internal network components of the operator. In one embodiment, the Marketing and Advertising System 100 enables SMS, MMS and WAP Push channels for marketing campaigns; and SMS, MMS channels for Advertising. In addition, the subscriber profile module 128 can be used to retrieve subscriber information and obtain a list of people to be targeted with ads based on demographic information or specific attributes about a specific person being looked up based on their phone number. All of this targeting of advertisements can be based on the data that the network operator has in the subscriber store 142 about each of its subscribers.

Figure 2:
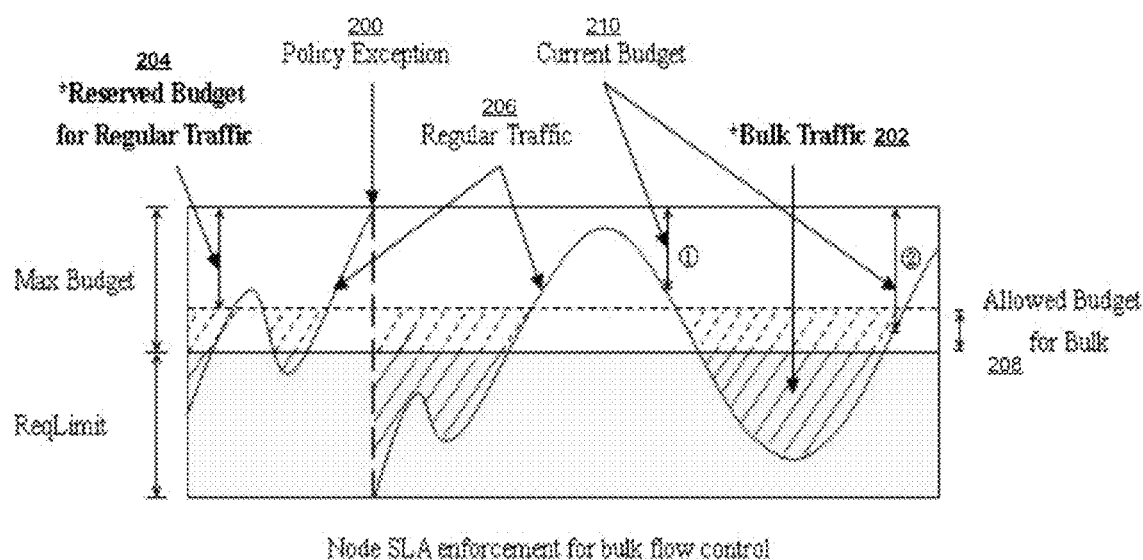
FIG. 2 is an illustration of a graph for performing the traffic handling in accordance with various embodiments of the invention.

FIG. 2 is an illustration of a graph for performing the traffic handling in accordance with various embodiments of the invention. It is noted that this graph is provided purely for purposes of illustration and that the particular traffic patterns shown herein are in no way intended to be limiting the disclosure.

As previously described, a bulk advertisement campaign can be created and scheduled using the marketing system. Once the bulk campaign is set to active, the network nodes of the operator can begin transmitting the bulk messages to the designated recipients. The traffic handling feature enables the network nodes to gracefully intersperse the bulk messages among the regular message traffic that they are already processing, without interfering with the regular traffic and without overwhelming the network.

As illustrated in the graph, the network nodes can continuously monitor the quantity of regular traffic 206 that they are processing at any given time. This monitoring can be performed in time intervals (e.g. message per second, etc). Each node has a maximum limit for processing messages that it is able to perform. If at any time, the maximum budget is exceeded, a policy exception 200 can be thrown, or some other error message generated by the node. Thus at any given point in time, the difference between the amount of traffic actually being processed by the node and its maximum limit is referred to as the current budget 210 or total budget.

In one embodiment, a budget or buffer for processing the bulk messages 208 can be created at the node level by setting two limits. The first limit can be used by the node to initiate the transmission of bulk traffic. This first limit is illustrated as the middle solid line in the figure. When the amount of overall traffic being processed by the node falls below this first limit, the node begins to transmit bulk messages from a queue. At the same time, the node also continues to monitor the amount of traffic being processed. This processing of bulk traffic continues until a second limit is reached, which is illustrated by the broken line above the solid middle line.

When the quantity of traffic being processed exceeds the second limit, the node begins to immediately cease the processing of bulk traffic 202 so as not to interfere with the node's ability to process its regular traffic. This can be implemented by first finishing processing the current message and not retrieving any more bulk messages from the queue or by immediately halting the processing of the current message. Effectively, the node capacity between the second limit and the absolute maximum limit is the budget reserved for its regular (non-bulk) traffic 204.

As further illustrated in the figure, the node can continue monitoring the amount of traffic being processed, so that when traffic once again falls below the first limit, the node can once again begin processing the bulk traffic. In this manner, a more dynamic distribution of bulk processing is achieved, where the nodes make certain to gradually distribute the bulk traffic in an optimal fashion, without overwhelming network traffic.

Figure 3:
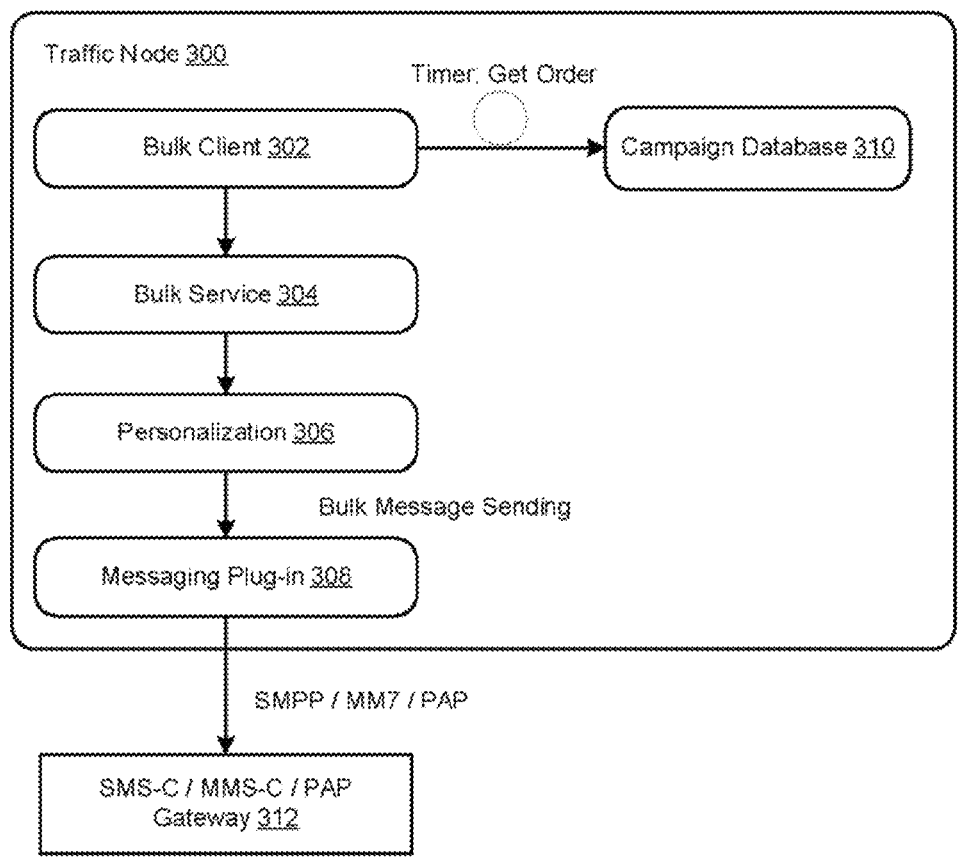
FIG. 3 is an illustration of a network node, in accordance with various embodiments of the invention.

FIG. 3 is an illustration of a network node, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated herein, the traffic node 300 can include a bulk client 302 that is initiated by a timer to obtain the order from a campaign database 310. The bulk service 304 can carry out the delivery of the bulk messages. In addition, the personalization engine 306 can use subscriber profile data to customize the bulk messages for each subscriber. In one embodiment, the bulk messages can be delivered to the network resources, such as an SMS-C, MMS-C, or PAP Gateway 312 using a messaging plug-in 308 that can communicate in the appropriate protocol with the network resource.

Figure 4:
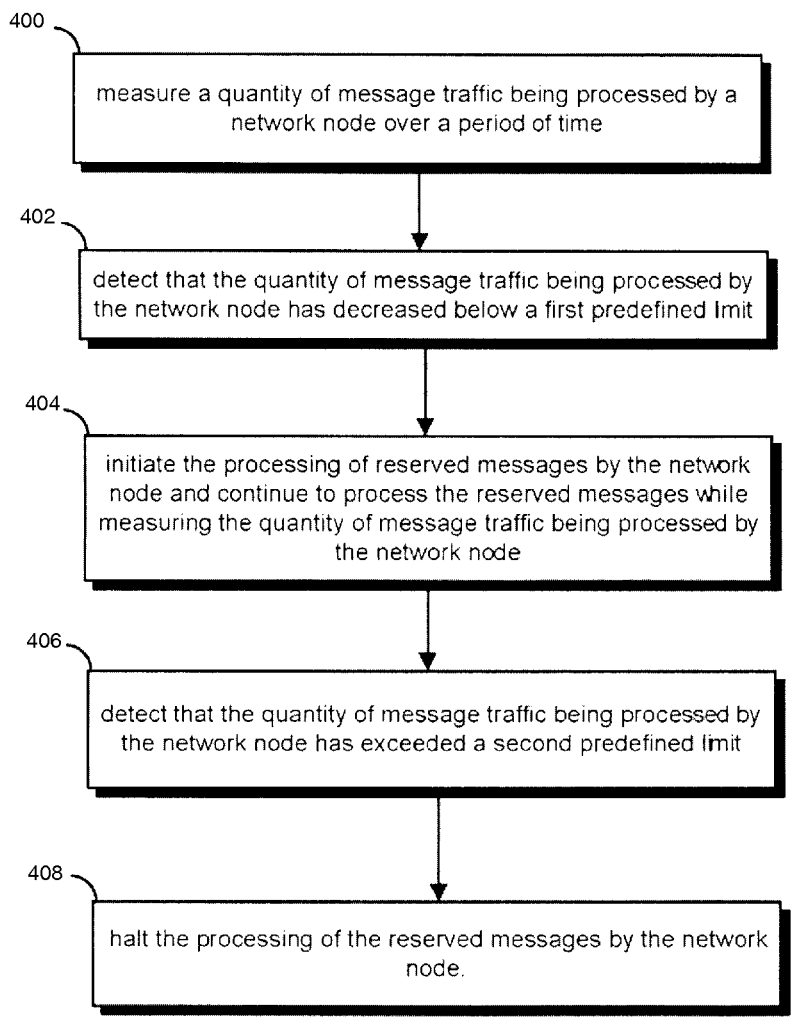
FIG. 4 is a flow chart diagram of the process for handling traffic, in accordance with various embodiments of the invention.

FIG. 4 is a flow chart diagram of the process for handling traffic, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown in step 400, the node can continue to measure a quantity of message traffic being processed by a network node. The measurements can be taken periodically over a particular defined period of time, such as messages per second or the like. In step 402, the node detects that the quantity of message traffic being processed by the network node has decreased below a first predefined limit. In one embodiment, the first limit can be made configurable. In step 404, when the node determines that the message traffic has decreased to a low enough level, it can initiate the processing of a set of reserved bulk messages. The node can then continue to process the bulk traffic while measuring the overall quantity of messages being processed by the network node. In step 406, the node detects that the quantity of message traffic being processed by said network node has exceeded a second predefined limit. In one embodiment, the second limit is also configurable by a user. When the overall traffic exceeds the second limit, the node can halt the processing of the reserved bulk messages (step 408). In various embodiments, the first limit can be set lower than the second limit. In alternative embodiments, the limits can be set to be the same.

Figure 5:
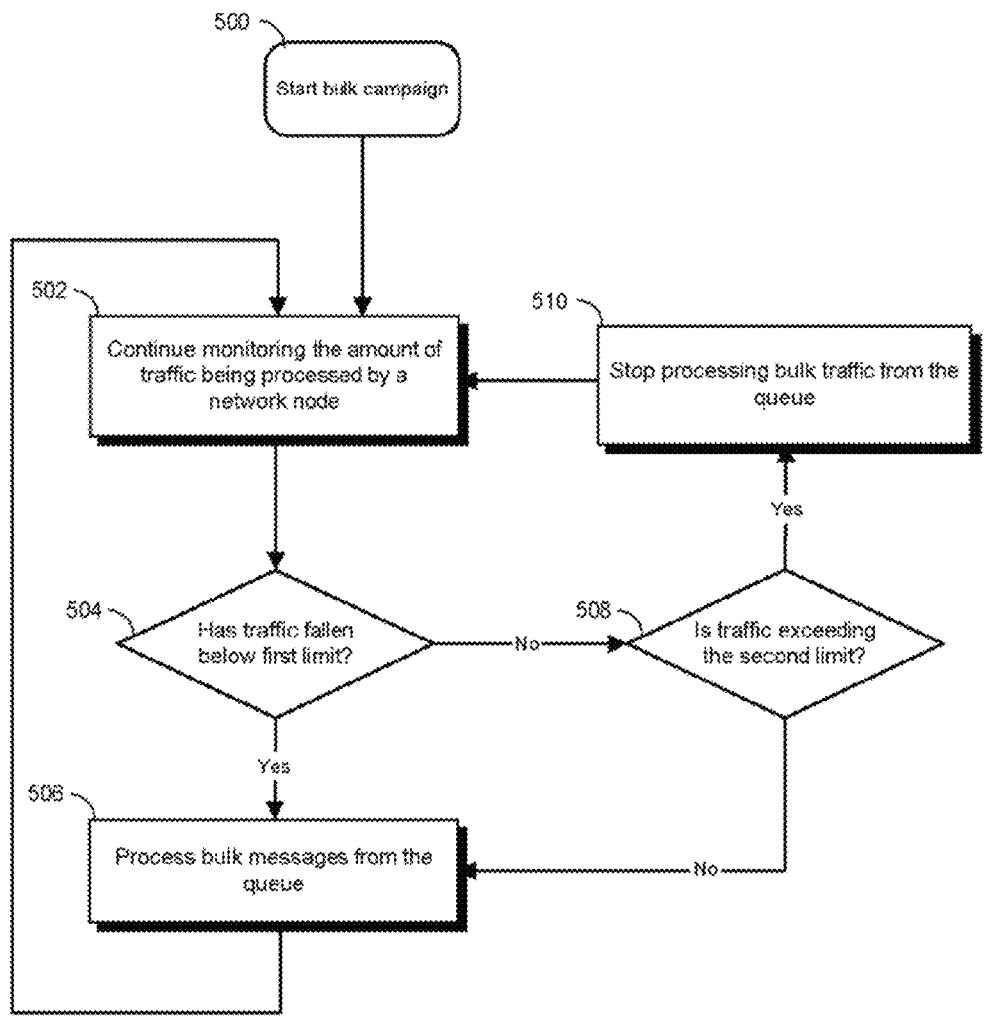
FIG. 5 is a logical flow chart diagram of the process for handling traffic, in accordance with various embodiments of the invention.

FIG. 5 is a logical flow chart diagram of the process for handling traffic, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown in step 500, the process can begin by scheduling an ad campaign using a campaign scheduler of the marketing communications system, as previously described. In step 502, once the campaign has been scheduled, each network node can continue monitoring the amount of messages that it is processing. In step 504, the node detects that the number of messages has fallen below a first threshold limit. In step 506 then, the node begins (or resumes) processing the bulk messages from a queue. If some time later, the node detects that the number of messages exceeds a second threshold limit (step 508), it can stop the processing of bulk messages from the queue, as shown in step 510. This process can continue until the end of the ad campaign has been reached (e.g. until all bulk messages have been delivered or the campaign has been canceled).

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. In various embodiments, the transmission may include a plurality of separate transmissions.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for traffic handling of mobile communications advertisements over a telecommunications network, said method comprising:

creating, via a marketing component executing on one or more microprocessors, an advertising campaign which includes bulk message traffic to be transmitted to subscribers of the telecommunications network over a period of time, wherein the bulk message traffic is stored in a queue;

providing a network node which is adapted to
  process regular message traffic;
  measure an amount of regular message traffic being processed by the network node, wherein the measurements are taken periodically over a defined period of time;
  detect the amount of regular message traffic being processed has fallen below a first threshold limit;
  execute the advertising campaign on the network node;
  process the bulk message traffic being processed by the network node, wherein the bulk message traffic is retrieved by the network node from the queue and transmitted to the respective subscribers;
  continuously measure a quantity of overall message traffic being processed by the network node per the defined period of time, wherein the quantity of overall message traffic includes the bulk message traffic interspersed among the regular message traffic;
  detect the quantity of overall message traffic being processed exceeds a second threshold limit, wherein the second threshold limit is higher than the first threshold limit;
  halt processing of the bulk message traffic being processed by said network node so as not to interfere with the ability to process the regular message traffic by said network node; and
  continuously measure the amount of regular message traffic being processed by the network node per the defined period of time so when the amount of regular message traffic falls below the first threshold limit, the network node begins processing the bulk message traffic again;
  wherein the method can continue until an end of the advertising campaign has been reached.

2. The method of claim 1, further comprising:
  resuming the processing of the bulk messages upon detecting that the quantity of overall message traffic being processed by the network node has again decreased below the first limit.

3. The method of claim 1, wherein the message traffic being processed by the network node includes short messaging service (SMS), multimedia messaging service (MMS) traffic and WAP Push traffic.

4. The method of claim 3, wherein processing capacity of the network node between the first limit and the second limit is a buffer for processing the bulk messages containing mobile advertisements.

5. The method of claim 1, further comprising:
  detecting that the quantity of overall message traffic being processed by the network node has exceeded a maximum budget for processing message traffic by said network node; and
  generating an error message by said network node.

6. The method of claim 1, whereby the first limit and the second limit enable the bulk messages to be processed by the network node while simultaneously preventing the bulk message traffic from interfering with the processing of the regular message traffic being processed by the network node.

7. The method of claim 1, wherein each step of said method is distributed and coordinated across a plurality of network nodes connected in a cluster network.

8. The method of claim 1, wherein each of the bulk messages is customized according to subscriber profile data of each recipient.

9. The method of claim 1, wherein the halting of processing the bulk messages is implemented by one of abruptly dropping bulk messages from the network node and precluding the network node from retrieving bulk messages from the queue.

10. The method of claim 1, wherein the network node intersperses a plurality of said bulk messages retrieved from the queue among regular messages being processed.

11. A system for traffic handling of mobile communications advertisements over a telecommunications network, said system comprising:
  a computer with a processor and memory, wherein the computer is connected as a network node of a cluster network and configured to perform the step comprising:
    creating, an advertising campaign which includes bulk message traffic to be transmitted to subscribers of the telecommunications network over a period of time, wherein the bulk message traffic is stored in a queue,
    processing regular message traffic;
    measuring an amount of regular message traffic being processed by the network node, wherein the measurements are taken periodically over a defined period of time;
    detecting the amount of regular message traffic being processed has fallen below a first threshold limit;
    executing the advertising campaign on the network node;
    processing the bulk message traffic being processed by the network node, wherein the bulk message traffic is retrieved by the network node from the queue and transmitted to the respective subscribers;
    continuously measuring a quantity of overall message traffic being processed by the network node per the defined period of time, wherein the quantity of overall message traffic includes the bulk message traffic interspersed among the regular message traffic;
    detecting the quantity of overall message traffic being processed exceeds a second threshold limit, wherein the second threshold limit is higher than the first threshold limit;
    halting processing of the bulk message traffic being processed by said network node so as not to interfere with the ability to process the regular message traffic by said network node; and
    continuously measuring the amount of regular message traffic being processed by the network node per the defined period of time so when the amount of regular message traffic falls below the first threshold limit, the network node begins processing the bulk message traffic again,
    wherein the method can continue until an end of the advertising campaign has been reached.

12. The system of claim 11, wherein the traffic handling system further performs the steps comprising:
  resuming the processing of the bulk messages upon detecting that the quantity of overall message traffic being processed by the network node has again decreased below the first limit.

13. The system of claim 11, wherein the message traffic being processed by the network node includes short messaging service (SMS), multimedia messaging service (MMS) traffic and WAP Push traffic.

14. The system of claim 13, wherein processing capacity of the network node between the first limit and the second limit is a buffer for processing the bulk messages containing mobile advertisements.

15. The system of claim 11, wherein the system further performs the steps comprising:
  detecting that the quantity of overall message traffic being processed by the network node has exceeded a maximum budget for processing message traffic by said network node; and
  generating an error message by said network node.

16. The system of claim 11, whereby the first limit and the second limit enable the bulk messages to be processed by the network node while simultaneously preventing the bulk traffic from interfering with the processing of the regular message traffic being processed by the network node.

17. The system of claim 11, wherein each of the bulk messages is customized according to subscriber profile data of each recipient.

18. The system of claim 11, wherein the halting of processing the bulk messages is implemented by one of abruptly dropping bulk messages from the network node and precluding the network node from retrieving bulk messages from the queue.

19. The system of claim 11, wherein the network node intersperses a plurality of said bulk messages retrieved from the queue among regular messages being processed.

20. A non-transitory computer-readable storage medium storing one or more sequences of instructions, said instructions, when executed by one or more processors, causing the one or more processors to carry out the steps comprising:
  creating, via a marketing component executing on one or more microprocessors, an advertising campaign which includes bulk message traffic to be transmitted to subscribers of the telecommunications network over a period of time, wherein the bulk message traffic is stored in a queue;
  providing a network node which is adapted to process regular message traffic;
  measure an amount of regular message traffic being processed by the network node, wherein the measurements are taken periodically over a defined period of time;
  detect the amount of regular message traffic being processed has fallen below a first threshold limit;
  execute the advertising campaign on the network node;
  process the bulk message traffic, wherein the bulk message traffic is retrieved by the network node from the queue and transmitted to the respective subscribers;
  continuously measure a quantity of overall message traffic being processed by the network node per the defined period of time, wherein the quantity of overall message traffic includes the bulk message traffic interspersed among the regular message traffic;
  detect the quantity of overall message traffic being processed exceeds a second threshold limit, wherein the second threshold limit is higher than the first threshold limit;
  halt processing of the bulk message traffic being processed by said network node so as not to interfere with the ability to process the regular message traffic by said network node; and
  continuously measure the amount of regular message traffic being processed by the network node per the defined period of time so when the amount of regular message traffic falls below the first threshold limit, the network node begins processing the bulk message traffic again;
  wherein the method can continue until an end of the advertising campaign has been reached.

* * * * *

UNITED STATES PATENT AND TRADEMARK OFFICE
CERTIFICATE OF CORRECTION

| | | |
|---|---|---|
| PATENT NO. | : 8,879,389 B2 | Page 1 of 1 |
| APPLICATION NO. | : 12/945745 | |
| DATED | : November 4, 2014 | |
| INVENTOR(S) | : Amitha Pulijala et al. | |

It is certified that error appears in the above-identified patent and that said Letters Patent is hereby corrected as shown below:

Title Page, Item (56)

Page 2, column 2, under Other Publications, line 11, delete "Nternational" and insert -- International --, therefor.

In the claims

Column 10, line 12, Claim 11, delete "creating," and insert -- creating --, therefor.

Signed and Sealed this
Seventeenth Day of May, 2016

Michelle K. Lee
*Director of the United States Patent and Trademark Office*